United States Patent [19]

Gordon et al.

[11] Patent Number: 4,591,183

[45] Date of Patent: May 27, 1986

[54] LUGGAGE CARRIER

[75] Inventors: Michael Gordon, New York; John R. Curreri, Bellmore, both of N.Y.

[73] Assignees: Christian Dior, S.A., Paris, France; Koret, Inc., New York, N.Y.

[21] Appl. No.: 608,149

[22] Filed: May 8, 1984

[51] Int. Cl.⁴ .............................................. B62B 1/04
[52] U.S. Cl. .................... 280/655; 280/47.29; 280/645
[58] Field of Search ............ 280/655, 654, 652, 47.27, 280/47.29, 37, 645

[56] References Cited

U.S. PATENT DOCUMENTS

| | | | |
|---|---|---|---|
| 1,278,100 | 9/1918 | Bruning | 403/108 |
| 1,748,426 | 2/1930 | Pentland | 74/841 |
| 1,859,223 | 5/1932 | Stevenson | 248/412 |
| 2,474,722 | 6/1949 | Blume | 135/50 |
| 2,565,848 | 8/1951 | Howard | 280/87.05 |
| 3,168,330 | 2/1965 | Smith et al. | 280/47.37 |
| 3,612,563 | 10/1971 | Kazmark, Sr. | 280/36 C |
| 3,647,238 | 3/1972 | Mackey | 280/47.29 |
| 3,702,016 | 11/1972 | Keesee | 16/111 |
| 3,998,476 | 12/1976 | Kazmark, Sr. | 280/655 |
| 4,121,855 | 10/1978 | Mortenson | 280/654 |
| 4,286,796 | 9/1981 | Esposito | 280/47.27 |
| 4,407,521 | 10/1983 | Zeitlin | 280/655 |
| 4,431,211 | 2/1984 | Carrigan | 280/47.29 |
| 4,458,914 | 7/1984 | Holtz | 280/655 |
| 4,546,995 | 1/1986 | Kassai | 280/655 |

FOREIGN PATENT DOCUMENTS

| | | | |
|---|---|---|---|
| 609088 | 6/1983 | Japan | 280/655 |
| 597785 | 4/1978 | Switzerland | 280/652 |
| 1357157 | 6/1974 | United Kingdom | 280/655 |
| 1469640 | 4/1977 | United Kingdom | 280/655 |
| 2019789 | 5/1978 | United Kingdom | 280/655 |
| 2040236 | 8/1980 | United Kingdom | 280/655 |
| 2082513 | 3/1982 | United Kingdom | 280/655 |

Primary Examiner—John A. Pekar
Assistant Examiner—Eric Culbreth
Attorney, Agent, or Firm—Philip H. Gottfried

[57] ABSTRACT

A luggage carrier, collapsible between an extended or in-use position and a retracted or storage position, includes a telescoping stand movable between a retracted position and an extended position, a base pivotally connected to the stand for movement between an extended position in which the base extends outwardly from the stand and a retracted position in which the base is aligned with the stand, and means for releasably locking both the stand and the base in their extended positions.

12 Claims, 11 Drawing Figures

LUGGAGE CARRIER

The invention relates to the field of portable luggage carriers and more particularly to the field of collapsible portable luggage carriers.

Portable luggage carriers for transporting suitcases and the like are well known in the art. Typically, these carriers are formed from a dolly or base equipped with wheels, from which extends a handle. One such luggage carrier is shown in U.S. Pat. No. 3,612,563 issued to Kazmark, Sr. on Oct. 12, 1971. This luggage carrier is formed from an L-shaped supporting bracket provided with a pair of wheels and an elastic strap. A handle, formed from telescoping or detachable sections is also secured to the supporting bracket. While this luggage carrier is satisfactory for some purposes it is not desirable for use with either bulky or heavy luggage in view of its single telescoping tube assembly and its short supporting bracket, which supporting bracket is necessary to permit storage of the luggage carrier when not in use. Further, this luggage carrier lacks a mechanism for quickly telescoping or collapsing the many sections of the handle, which is an inconvenience when carrying any type of luggage.

U.S. Pat. No. 3,998,476 issued to Kazmark, Sr. On Dec. 21, 1976, shows a luggage carrier which attempts to overcome the disadvantages outlined above. This luggage carrier is formed from a handle employing a pair of telescoping tube assemblies which may be simultaneously collapsed by activating a hand operated relase bar while pushing downwardly on the handle. The telescoping tube assemblies are pivotally secured to a stand formed with a pair of wheels. While this luggage carrier may be better equipped to handle heavy and/or bulky luggage, it incorporates other disadvantages. For example, the use of a stand which is pivotally hinged to the handle assembly creates an unsteady luggage carrier which will not support itself in its in-use position, thereby permitting the telescoping tube assembly to be easily knocked over. In addition, to unlock the telescoping tube assembly from its in-use position requires the use of both hands, one to push down on the handle and the other to activate the release bar, which is often extremely inconvenient and sometimes imposible, especially when travelling.

Accordingly, it is an object of the present invention to provide a luggage carrier collapsible between an in-use position and a storage position.

Another object of the present invention is to provide a collapsible luggage carrier which may be releasably locked in the in-use position.

Still another object of the present invention is to provide a collapsible luggage carrier which does not require the use of two hands to release it from the in-use position.

A still further object of the present invention is to provide a collapsible luggage carrier which will support itself in the in-use position.

An additional object of the present invention is to provide a luggage carrier in which luggage-holding straps may also be used to secure the luggage carrier in its storage position.

In accordance with the present invention, a luggage carrier, collapsible between an extended or in-use position and a retracted or storage position, includes a telescoping stand movable between a retracted position and an extended position, a base pivotally connected to the stand for movement between an extended position in which the base extends outwardly from the stand and a retracted position in which the base is aligned with the stand, and means for releasably locking both the stand and the base in their extended positions.

The above brief description as well as further objects, features and advantages of the present invention will be more fully understood by reference to the following detailed description of the presently preferred but nonetheless illustrative embodiment in accordance with the present invention, when taken in conjunction with the accompanying drawing, wherein.

Figure 1:
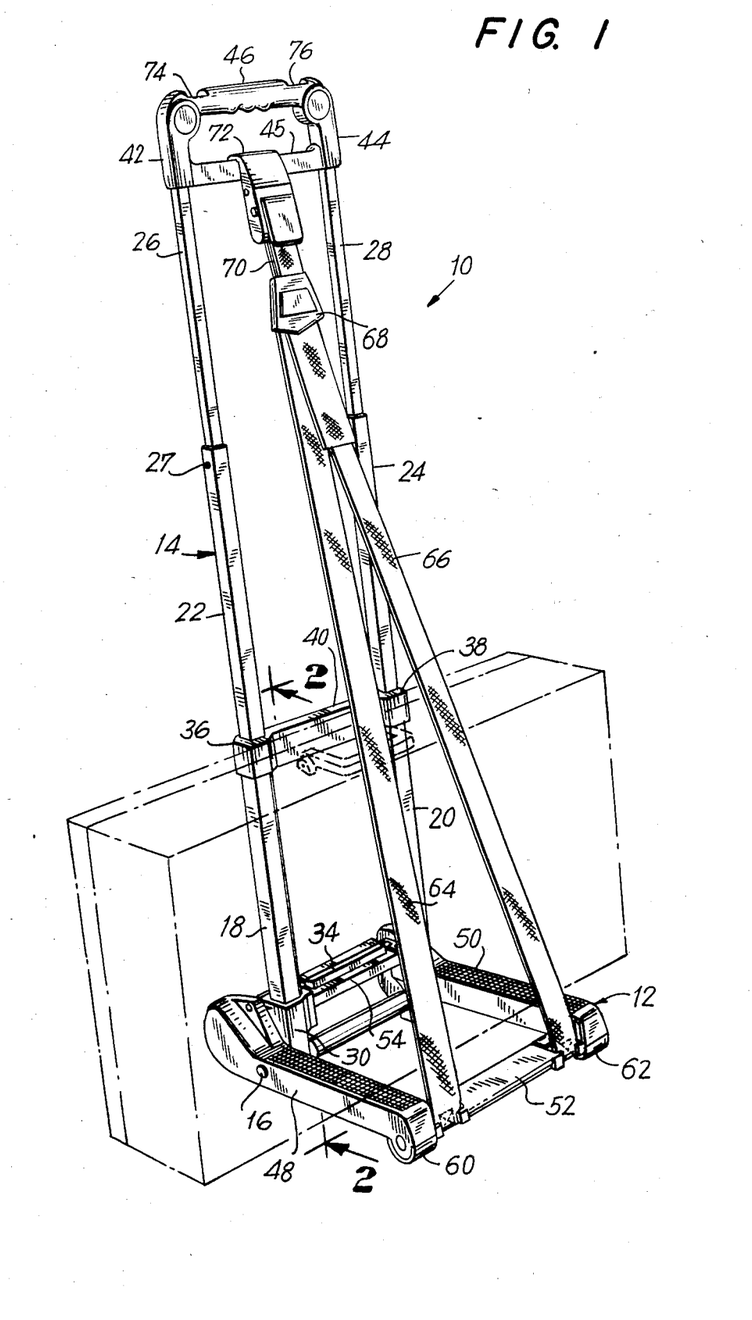
FIG. 1 is a reduced size front elevational perspective view of the luggage carrier of the present invention shown in its in-use position.
Figure 2:
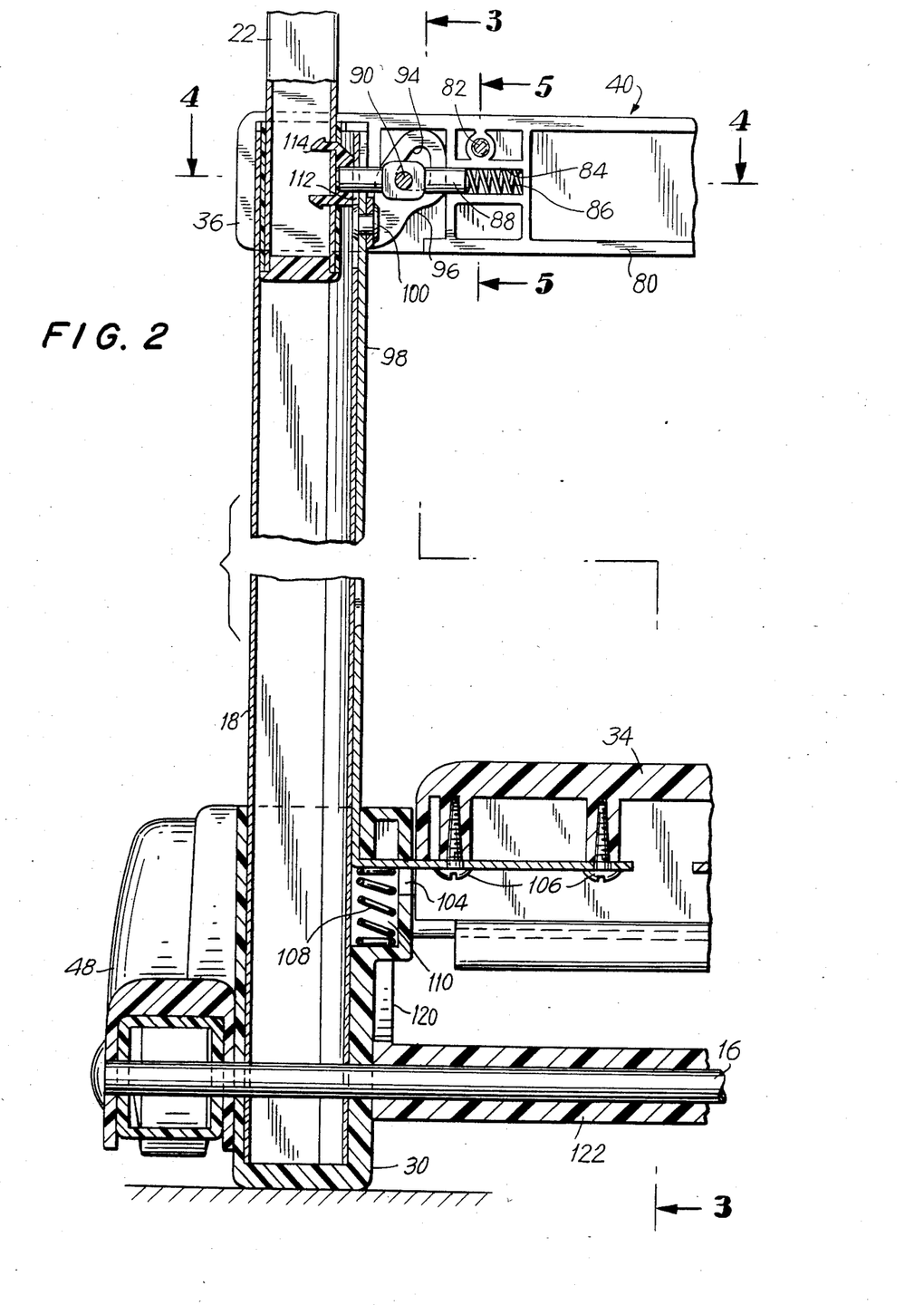
FIG. 2 is a fragmentary front elevational sectional view of the luggage carrier taken substantially along the line 2—2 of FIG. 1 and looking in the direction of the arrows.
Figure 8:
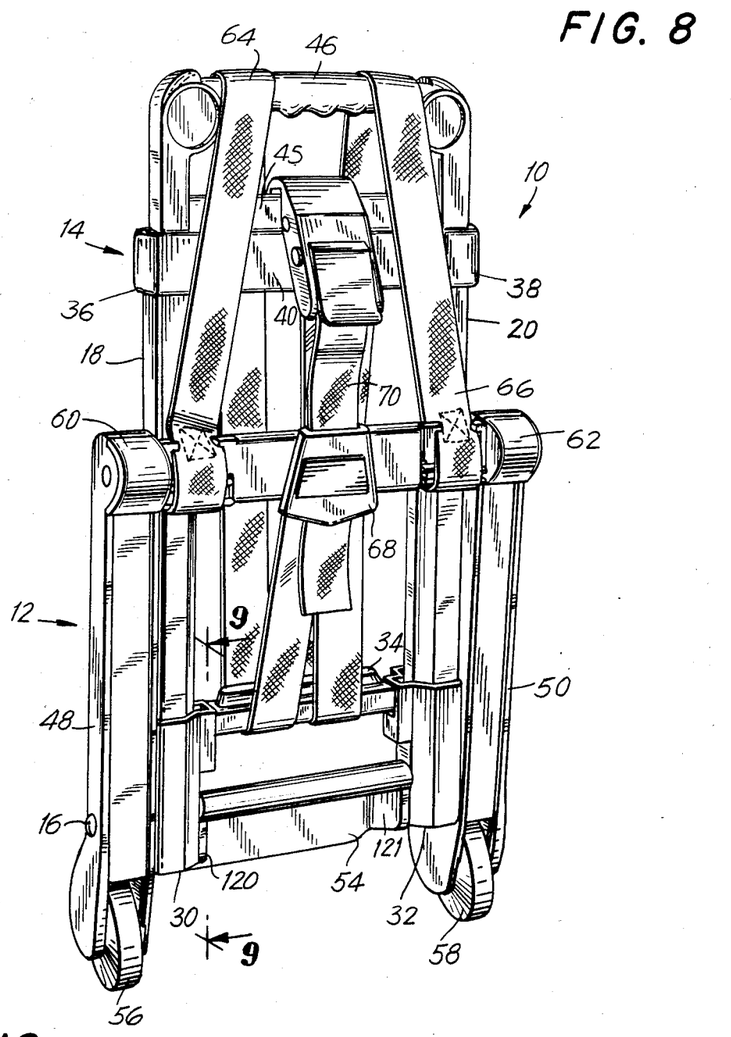
FIG. 8 is a reduced side front elevational perspective view of the luggage carrier of the present invention shown in its storage position.

Referring now to the drawing and first to FIG. 1, a luggage carrier, indicated generally by the reference numeral 10, includes a base 12 pivotally connected to a stand 14 by an elongated pivot pin 16. The base 12 and the stand 14 are movable between an extended or in-use position, as best seen in FIG. 1, and a retracted or storage position, as best seen in FIG. 8. In the in-use position of FIG. 1 the base 12 extends outwardly from elongated stand 14 and both the base 12 and stand 14 cooperate to hold luggage, such as boxes, suitcases, golf bags and the like, as shown in phantom in FIG. 1.

The stand 14 is formed from a pair of left and right lower tubes 18 and 20 from which respective intermediate tubes 22 and 24 and respective upper tubes 26 and 28 telescope. The ends of lower tubes 18 and 20 remote from respective intermediate tubes 22 and 24 are seated in respective sleeves 30 and 32 between which extends a foot pedal 34. The upper ends of respective lower tubes 18 and 20 are received and held in the respective left and right sleeves 36 and 38 of a tube locking assembly 40. The upper ends of respective upper tubes 26 and 28 are received and held in respective sleeve portions 42 and 44 of a handle 46. The foot pedal 34 and sleeves 30 and 32, tube locking assembly 40 and handle 46 serve to maintain tubes 18, 22 and 26 in parallel spaced relationship with tubes 20, 24 and 28.

Figures 3, 4, 5:
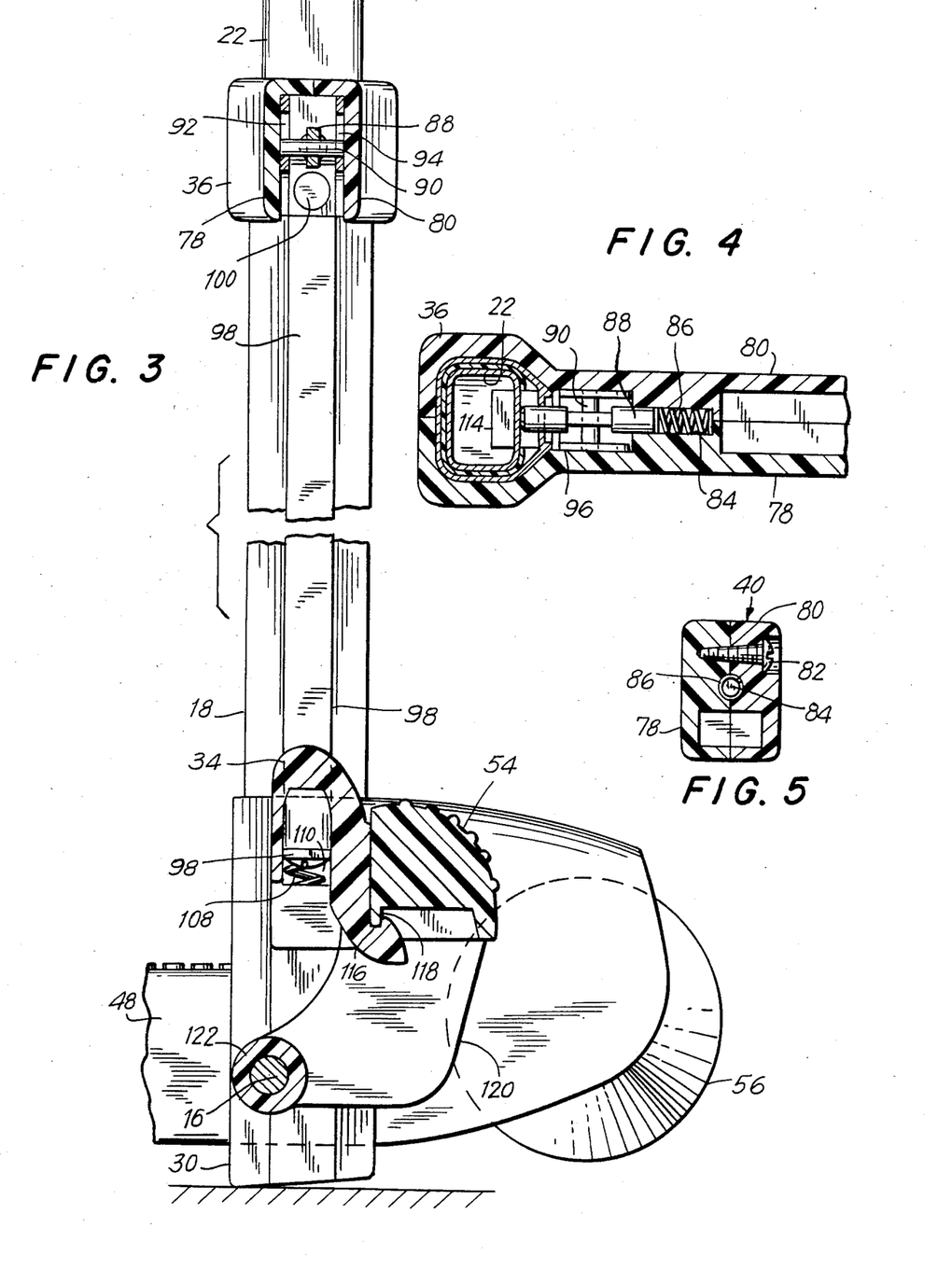
FIG. 3 is a fragmentary right side elevational sectional view of the luggage carrier taken substantially along the line 3—3 of FIG. 2 and looking in the direction of the arrows.
FIG. 4 is a fragmentary top plan sectional view of the locking assembly of the luggage carrier taken substantially along the line 4—4 of FIG. 2 and looking in the direction of the arrows.
FIG. 5 is a right side elevational sectional view of the locking assembly of the luggage carrier taken along the line 5—5 of FIG. 2 and looking in the direction of the arrows.
Figures 7, 9:
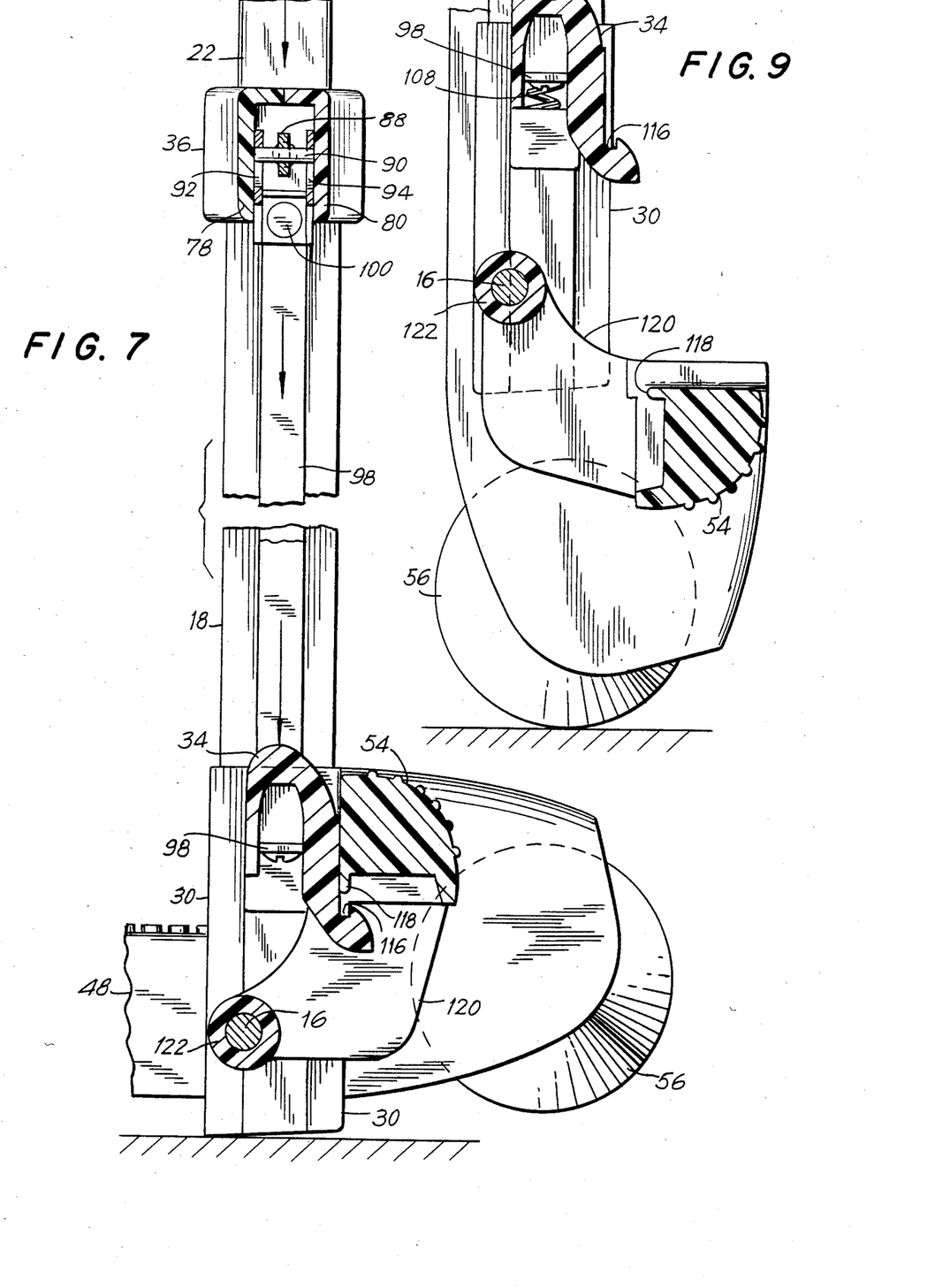
FIG. 7 is a fragmentary right side elevational sectional view of the luggage carrier, similar to the view shown in FIG. 3, taken substantially along the line 7—7 of FIG. 6 and looking in the direction of the arrows.
FIG. 9 is a fragmentary right side elevational sectional view of the luggage carrier taken substantially along the line 9—9 of FIG. 8 and looking in the direction of the arrows.
Figure 10:
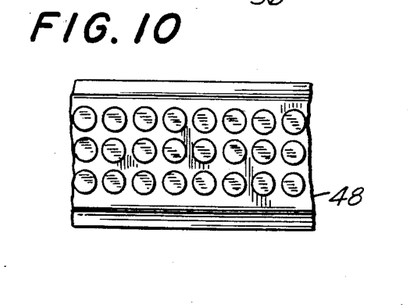
FIG. 10 is a fragmentary top plan view of a portion of the base of the luggage carrier.
Figure 11:
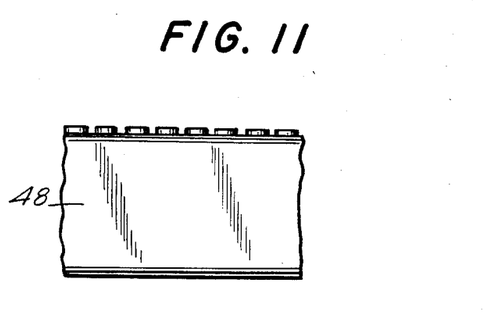
FIG. 11 is a fragmentary left side elevational view of this portion of the base of the luggage carrier of FIG. 10.

Base 12 is formed from a pair of spaced apart luggage supporting platforms 48 and 50 connected to each other at one end by a transversely extending brace 52 and at the other end by a stop-lock bar 54. The upper surface of the platforms 48 and 50 are formed so as to minimize slippage of luggage carried thereon, as shown in FIGS. 10 and 11. The ends of respective platforms 48 and 50 proximate to the stop-lock bar 54, support respective wheels 56 and 58 (see FIG. 8) for rotation, thereby permitting the luggage carrier 10 to be wheeled. As best seen in FIGS. 3 and 7, the bottom of sleeves 30 and 32 are inclined towards respective wheels 56 and 58 to facilitate tipping the luggage carrier 10 backwards to bring the wheels 56 and 58 in contact with the ground. In addition, the wheels are so mounted on the platforms to permit the luggage carrier 10 to be wheeled even when tipped backwardly at a severe angle.

The ends of the platforms 48 and 50 proximate to the brace 52 are formed with cylindrically shaped stops 60 and 62. When both the stand 12 and the base 14 are in their fully extended positions (F G. 1), the luggage carrier 10 is supported on the bottom of the sleeves 30 and 32 and on stops 60 and 62 with the wheels 56 and 58 maintained out of contact with the ground, as best seen in FIGS. 3 and 7.

One end of each of a pair of straps 64 and 66 are secured to opposite ends of brace 52 by any suitable means, and the other end of the straps are secured to a common buckle 68. A third strap 70 extends from the buckle 68 and terminates in a hook 72, which may be secured to a lower handle cross brace 45 of the handle 46. In addition, hook 72 provides, in a conventional manner, for the adjustment of the length of the strap 70. When the luggage carrier 10 is in the in-use position (FIG. 1), straps 64, 66 and 70 and hook 72 serve to hold luggage carrier thereon against the base 12 and stand 14. When the luggage carrier 10 is in the storage position (FIG. 8) the straps 64, 66 and 70 and hook 72 may be used as shown in FIG. 8 to maintain the luggage carrier in the storage position and prevent its undesired opening. Handle 46 is formed with a pair of strap grooves 74 and 76 which prevent straps 64 and 66 from sliding off the top of the handle 46.

Upper tubes 26 and 28 are locked in their extended positions by means of any suitable spring loaded detent, such as ball, located in the lower ends of upper tubes 26 and 28 and biassed to extend through suitably shaped openings formed in the upper ends of respective intermediate tubes 22 and 24. The detent 27 for tube 26 is shown extending through an opening in intermediate tube 22. Upon the application of downward pressure on handle 46, detent 27 is moved inwardly permitting upper tube 26 to telescope into intermediate tube 22.

The luggage carrier 10 is moved from the in-use position (FIG. 1) to the storage position (FIG. 8) by depressing the foot pedal 34 which permits intermediate tubes 22 and 24 and upper tubes 26 and 28 to telescope into respective lower tubes 18 and 20 (upper tubes 26 and 28 may be telescoped directly into respectively intermediate tubes 22 and 24 without depression of the pedal 34). Depression of the foot pedal 34 also permits pivotal movement of the base 12 from a position in which it is generally perpendicular to the stand 14 to a position in which it is aligned with the stand 14.

To move the luggage carrier 10 from its storage position (FIG. 8) to its in-use position (FIG. 1), requires release of the hook 72 from the handle cross brace 45 and unwinding of the straps 64, 66 and 70. The base 12 may then be pivotally moved to a position in which it is perpendicular to the stand 14 at which position it abuts stop-lock bar 54. Base 12 is locked into place by the stop-lock bar 54 engaging the foot pedal 34 in a manner to be more fully described below. Handle 46 may then be moved upwardly, perhaps while stepping on foot pedal 34, telescoping arms 22, 26 and 24, 28 out of respective lower tubes 18 and 20. Spring loaded detents, described above, serve to lock upper tubes 26 and 28 in their fully extended position upon their withdrawal from respective intermediate tubes 22 and 24. Locking assembly 40 serves to lock intermediate tubes 22 and 24 in their fully extended position in a manner to be more fully described hereinafter. The extention and retraction of the base 12 and stand 14 permitting movement of the luggage carrier between the in-use and storage positions will now be described in detail, beginning with the locking assembly 40.

Referring now particularly to FIGS. 2-6, the locking assembly 40 includes two identical locking mechanisms, one associated with tubes 18, 22 and 26 and the other associated with tubes 20, 24 and 28. Each of the locking mechanisms are released by depressing the foot pedal 34, and as such, only the mechanism associated with tubes 18, 22 and 26 will be described in detail. Locking assembly 40 is formed from two pieces of moled plastic 78, 80 (see FIG. 3) which are secured to each other by screws 82 (see FIG. 5). Pieces 78 and 80 form sleeves 36 and 38 which hold respective lower tubes 18 and 20. An internal channel 84, formed by pieces 78 and 80, is adapted to receive a spring 86. Spring 86 biases a detent 88 towards lower tube 18 and intermediate tube 22. Detent 88 is formed with guide pin 90 which extends through the detent at right angles thereto. The opposite ends of the guide pin 90 are adapted to ride in respective triangular shaped openings 92 and 94 formed in cans 96 which is located within piece 80. Cam 96 is secured to the upper end of an operating bar 98 by a rivet 100. Bar 98 extends for the entire length of the lower tube 18, through an opening 104 formed in the upper portion of sleeve 32, and is secured to foot pedal 34 by screws 106 (see FIG. 6). Opening 104 located within sleeve 30 (FIG. 2) defines the limits of vertical movement of the foot pedal 34 and a compression spring 108 located in a chamber 110 located within sleeve 30 biases the foot pedal 34 upwardly, urging bar 98 to move cam 96 upwardly, thereby permitting spring 86 to bias detent 88 in the direction of tubes 18 and 22 through an opening 112 formed in the lower tube 18. In view of the foregoing arrangement of elements, when intermediate leg 22 is in its fully extended position (FIG. 2) the end of detent 88 opposite from spring 86 will enter socket 114, which is secured to the lower end of intermediate tube 22, locking tube 22 in its fully extended position. A locking mechanism identical to that described for tubes 18, 22 and 26 is used for tubes 20, 24 and 28 and both are released by depressing foot pedal 34.

As best seen in FIG. 3, foot pedal 34 is formed with a downwardly extending portion which forms an elongated notch 116 extending the length of the pedal. When base 12 is in its fully extended position, perpendicular to stand 14, notch 116 is adapted to receive and hold an elongated tab 118 which extends from the stop-lock bar 54, along its length. Bar 54 is secured at opposite ends to respective platforms 48 and 50 and is also pivotally connected to pin 16 by arms 120 and 121 (see FIGS. 2 and 3). Arms 120 and 121 connect bar 54 to opposite ends of a sleeve 122 which surrounds pin 16. In view of the foregoing arrangement of elements, bar 54 moves with the base 12 and abuts foot pedal 34 when the base 12 is in its fully extended position, perpendicular to stand 14. In this position, spring 108 urges foot pedal 34 upwardly, thereby moving notch 116 into engagement with tab 118 to lock base 12 in its fully extended position.

Figure 6:
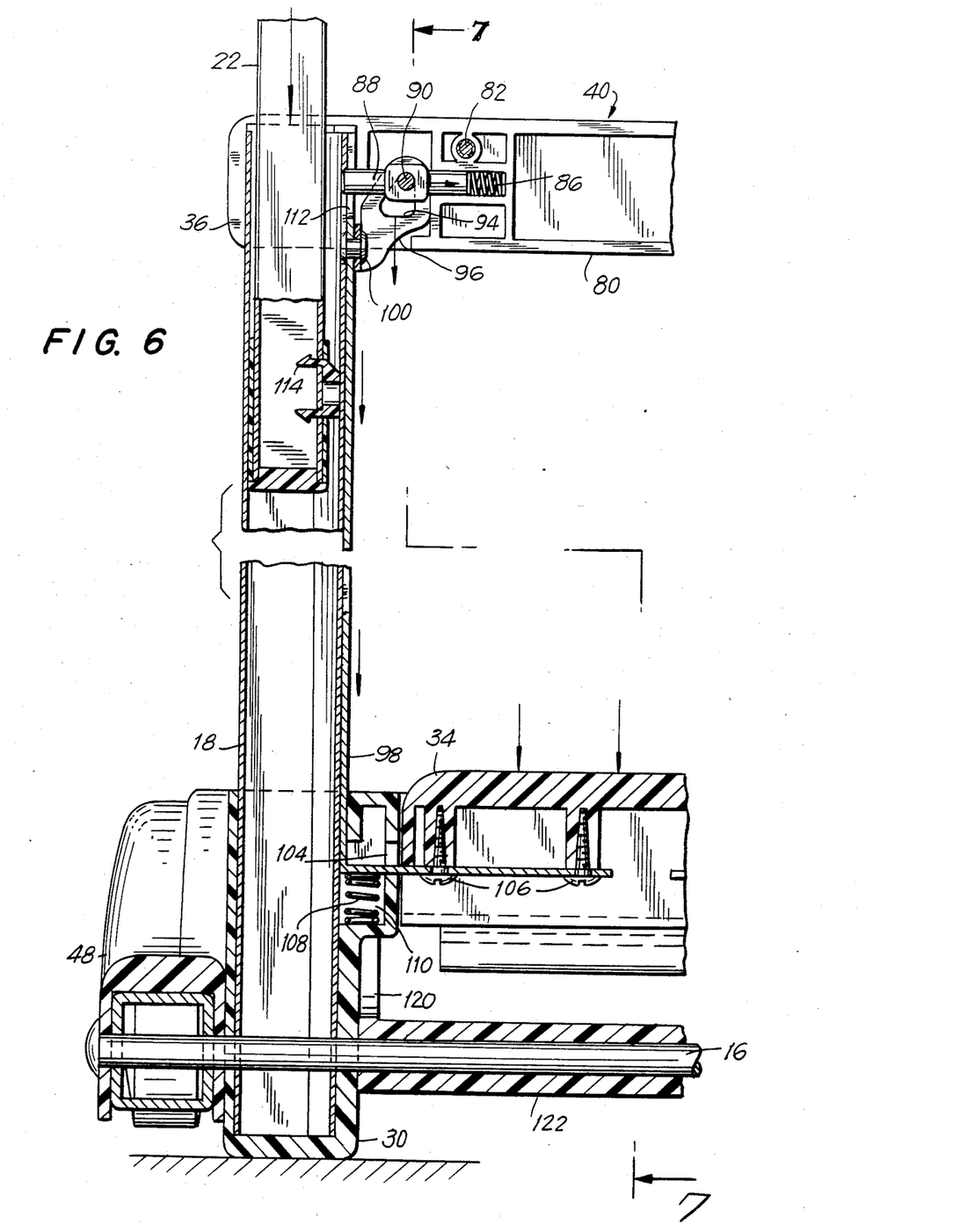
FIG. 6 is a fragmentary front elevational sectional view of the luggage carrier similar to the view shown in FIG. 2, but showing the unlocking of the luggage carrier from its in-use position.

Referring now to FIGS. 6–11, to move the luggage carrier 12 from the in-use position (FIG. 1) to the storage position (FIG. 8) requires the unlocking of the base 12 and intermediate tubes 22 and 24 from their extended positions. This is accomplished by depressing foot pedal 34 to move bar 98 downwardly so that it abuts the lower end of opening 104. Downward movement of bar 98 pulls cam 96 downwardly causing triangular-shaped openings 92 and 94 to move guide pin 90 backwardly against the action of spring 86, moving detent 88 out of socket 114 to permit intermediate tube 22 and upper tube 26 to telescope into lower tube 18 (FIG. 6).

In addition, depression of the foot pedal 34, so that bar 98 abuts the lower end of opening 104, moves notch 116 downwardly thereby releasing tab 118 of stop-lock bar 54 (FIG. 7). Base 12 is then free to pivot on pin 16 until it is aligned with stand 14 (FIG. 9). The luggage carrier 10 may thereby be collapsed with the use of one hand and one foot.

As will be readily apparent to those skilled in the art, the invention may be used in other specific forms or for other purposes without departing from its spirit or essential characteristics. The present embodiment is therefore to be considered as illustrative and not restrictive, the scope of the invention being indicated by the claims rather than by the foregoing description, and all embodiments which come within the meaning and range of equivalence of the claims are intended to be embraced therein.

We claim:

1. A luggage carrier collapsible between an extended or in-use position and a retracted or storage position comprising a telescoping stand movable between a retracted position and an extended position, a base pivotally connected to said stand for movement between an extended position in which the base extends outwardly from the stand and a retracted position in which said base is aligned with said stand, and means for releasably locking both said stand and said base in their extended positions so that movement of both said base and said stand to their retracted position is prevented and use of said carrier is permitted, said telescoping stand comprising a first set of telescoping tubes and a second set of telescoping tubes maintained in parallel spaced relationship with said first set of tubes, each of said sets of tubes being movable between an extended position and a retracted position, said stand including a pair of wheels, said base comprising a pair of platforms maintained in parallel spaced relationship, each of said platforms adapted to carry one of said wheels, a plurality of straps, the respective opposite ends of which are secured to said base and said stand, said straps adapted to be used to secure objects to said luggage carrier, and said means for releasably locking both said stand and said base in their extended positions including a foot operated pedal adapted upon actuation to unlock both said stand and said base from their extended positions.

2. Apparatus as in claim 1 in which said means for releasably locking both said stand and said base in their extended positions further includes means extending between said first and second sets of telescoping tubes of said stand for releasably locking said tubes in their extended position, said means extending between said first and second set of telescoping tubes adapted to unlock said telescoping tubes from their extended position upon actuation of said foot pedal.

3. Apparatus in claim 2 in which said means for releasably locking both said stand and said base in their extended positions further includes means extending between said pair of platforms of said base for releasably locking said base in its extended position, said means extending between said pair of platforms adapted to unlock said base from its extended position upon actuation of said foot pedal.

4. A luggage carrier collapsible between an extended or in-use position and a retracted or storage position comprising a telescoping stand movable between a retracted position and an extended position, a base pivotally connected to said stand for movement between an extended position in which the base extends outwardly from the stand and a retracted position in which said base is aligned with said stand and means for releasably locking both said stand and said base in their extended positions to permit use of said luggage carrier including means for simultaneously unlocking both said base and said stand to permit movement of said luggage carrier to its storage position.

5. Apparatus as in claim 4 in which said telescoping stand comprises a first set of telescoping tubes and a second set of telescoping tubes maintained in parallel spaced relationship with said first set of tubes, each of said sets of tubes being movable between an extended position and a retracted position.

6. Apparatus as in claim 5 in which said stand includes a pair of wheels.

7. Apparatus as in claim 6 in which said stand comprises a pair of platforms maintained in parallel spaced relationship, each of said platforms adapted to carry one of said wheels.

8. Apparatus as in claim 7 which further comprises a plurality of straps, the respective opposite ends of which are secured to said base and said stand, said straps adapted to be used to secure objects to said luggage carrier.

9. Apparatus as in claim 8 in which said plurality of straps, the respective opposite ends of which are secured to said base and said stand, are adapted to be used to secure said luggage carrier in its retracted or storage position.

10. Apparatus as in claim 9 in which said means for simultaneously unlocking both said base and said stand comprises a foot operated pedal.

11. Apparatus as in claim 10 in which said means for releasably locking both said stand and said base in their extended positions further includes means extending between said first and second sets of telescoping tubes of said stand for releasably locking said tubes in their extended position, said means extending between said first and second set of telescoping tubes adapted to unlock said telescoping tubes from their extended position upon actuation of said foot pedal.

12. Apparatus as in claim 11 in which said means for releasably locking both said stand and said base in their exended positions further includes means extending between said pair of platforms of said base for releasably locking said base in its extended position, said means extending between said pair of platforms adapted to unlock said base from its extended position upon actuation of said foot pedal.

* * * * *